United States Patent
Hsieh et al.

(10) Patent No.: US 9,959,085 B2
(45) Date of Patent: *May 1, 2018

(54) PROCESSING METHOD AND SYSTEM FOR IDENTIFYING DATA BY AN AUDIO CONVERSION DEVICE

(71) Applicants: Kuanhong Hsieh, Guangdong (CN); Weizhi Yang, Guangdong (CN); Shixuan Yu, Guangdong (CN)

(72) Inventors: Kuanhong Hsieh, Guangdong (CN); Weizhi Yang, Guangdong (CN); Shixuan Yu, Guangdong (CN)

(73) Assignee: 1MORE INC., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/383,270

(22) Filed: Dec. 19, 2016

(65) Prior Publication Data

US 2017/0235539 A1 Aug. 17, 2017

Related U.S. Application Data

(63) Continuation of application No. 14/888,066, filed as application No. PCT/CN2015/079803 on May 26, 2015, now Pat. No. 9,570,084.

(30) Foreign Application Priority Data

Jun. 13, 2014 (CN) .......................... 2014 1 0265947

(51) Int. Cl.
*G06F 3/00* (2006.01)
*G06F 3/16* (2006.01)
(Continued)

(52) U.S. Cl.
CPC .............. *G06F 3/162* (2013.01); *G06F 3/165* (2013.01); *G06F 21/00* (2013.01); *G06F 21/34* (2013.01);
(Continued)

(58) Field of Classification Search
None
See application file for complete search history.

(56) References Cited

U.S. PATENT DOCUMENTS

2008/0194209 A1 8/2008 Haupt et al.
2013/0262569 A1 10/2013 Ahn et al.
(Continued)

FOREIGN PATENT DOCUMENTS

| CN | 101630963 A | 1/2010 |
| CN | 102308562 A | 1/2012 |
| CN | 102547502 A | 7/2012 |

OTHER PUBLICATIONS

Non-English Chinese Office Action dated Jan. 29, 2018 with English translation for Application No. CN 201410265947.5.
(Continued)

*Primary Examiner* — Muhammad N Edun
(74) *Attorney, Agent, or Firm* — Ladas & Parry LLP

(57) ABSTRACT

A processing method for identifying data by an audio conversion device includes: connecting the audio conversion device to a first terminal; sending an identification code stored in the audio conversion device to the first terminal, and sending the identification code to a server via the first terminal, wherein the identification code is used to identify the audio conversion device; obtaining user data; uploading the user data to the server, such that the server stores a correspondence between the identification code and the user data; connecting the audio conversion device to a second terminal; sending the identification code stored in the audio conversion device to the second terminal; sending a data obtaining request containing the identification code to the server; and receiving the user data sent corresponding to the identification code in response to the data obtaining request, (Continued)

or receiving multimedia data matching multimedia using feature information in the user data.

14 Claims, 3 Drawing Sheets

(51) Int. Cl.

| | |
|---|---|
| H04L 29/08 | (2006.01) |
| G10L 19/018 | (2013.01) |
| H04R 1/10 | (2006.01) |
| G06F 21/00 | (2013.01) |
| G06F 21/34 | (2013.01) |
| G06F 21/35 | (2013.01) |
| H04B 3/04 | (2006.01) |
| H04W 4/00 | (2018.01) |

(52) U.S. Cl.
CPC ............ *G06F 21/35* (2013.01); *G10L 19/018* (2013.01); *H04B 3/04* (2013.01); *H04L 29/08* (2013.01); *H04R 1/1033* (2013.01); *H04R 1/1041* (2013.01); *H04W 4/003* (2013.01); *H04W 4/008* (2013.01)

(56) References Cited

U.S. PATENT DOCUMENTS

2013/0279300 A1   10/2013   Iwase et al.
2014/0045548 A1   2/2014    Takei

OTHER PUBLICATIONS

Espacenet English abstract of CN 102308562 A.
Espacenet English abstract of CN 101630963 A.
Espacenet English abstract of CN 102547502 A.

PROCESSING METHOD AND SYSTEM FOR IDENTIFYING DATA BY AN AUDIO CONVERSION DEVICE

CROSS REFERENCE APPLICATIONS

This application is a continuation of U.S. Ser. No. 14/888,066 filed Oct. 29, 2015, which is a 371 of International Application PCT/CN2015/079803 filed May 26, 2015, which claims the benefit of Chinese Patent Application No. 201410265947.5, titled as "Processing method and system for identifying data by an earphone", filed on Jun. 13, 2015, the disclosure of which is incorporated herein in its entirety by reference.

FIELD OF THE INVENTION

The present invention relates to a field of computer technologies, and more particularly relates to a processing method and a system for identifying data by an audio conversion device.

BACKGROUND OF THE INVENTION

Nowadays, mobile phones are able to be connected to the Internet. A user can login a server by entering an ID code and a password on a mobile phone, and obtain music data from the server. By this way, the user can enjoy a differentiated music service provided by the server. For instance, an ordinary-quality music downloading service can be provided to ordinary users, while a high-quality music downloading service is provided to users who pay.

However, it is cumbersome and not convenient for the user to login the server by entering the ID code and the password on the mobile phone every time to store corresponding music data and obtain the music data when needed. Even though it can be more convenient for the user to automatically login the server by recording the ID code and the password, the user still has to reenter the ID code and the password when he uses another mobile phone, which leads to a bad user experience.

SUMMARY OF THE INVENTION

Accordingly, it is necessary to provide a simple and convenient processing method and a system for identifying data by an audio conversion device.

A processing method for identifying data by an audio conversion device, comprising:

connecting the audio conversion device to a first terminal;

sending, by the audio conversion device, an identification code stored in the audio conversion device to the first terminal, and sending the identification code to a server via the first terminal; wherein the identification code is stored in the server and used to identify the audio conversion device;

obtaining, by the first terminal, user data;

uploading, by the first terminal, the user data to the server, wherein the user data is used to establish a correspondence between the identification code and the user data in the server;

connecting the audio conversion device to a second terminal;

sending, by the audio conversion device, the identification code stored in the audio conversion device to the second terminal;

sending, by the second terminal, a data obtaining request containing the identification code to the server; and receiving, by the second terminal, the user data sent by the server in response to the data obtaining request, the user data has the correspondence with the identification code, or receiving, by the second terminal, multimedia data matching multimedia using feature information in the user data.

A processing system for identifying data by an audio conversion device, including an audio conversion device, a first terminal, and a second terminal; wherein the audio conversion device is configured to be connected to the first terminal;

the audio conversion device is further configured to send an identification code stored in the audio conversion device to the first terminal, wherein the identification code is used to identify the audio conversion device;

the first terminal is configured to send the identification code to a server, and the server stores the identification code;

the first terminal is further configured to obtain user data;

the first terminal is further configured to upload the user data to the server, and the server stores a correspondence between the identification code and the user data;

the audio conversion device is further configured to be connected to the second terminal;

the audio conversion device is further configured to send the identification code stored in the audio conversion device to the second terminal;

the second terminal is configured to send a data obtaining request containing the identification code to the server; and the second terminal is further configured to receive the user data sent by the server in response to the data obtaining request, the user data has the correspondence with the identification code, or the second terminal is further configured to receive multimedia data matching multimedia using feature information in the user data.

According to the above processing method and system for identifying data by an audio conversion device, when the audio conversion device is connected to the first terminal, the identification code stored in the audio conversion device can be sent to the first terminal. The first terminal then sends the identification code to the server, and the server stores the identification code. User data is stored in the server corresponding to the identification code, by this way, the identification codes can be used as identifications for distinguishing users, and the user data belong to a user can be stored in the server corresponding to the identification code, and a different data service can be provided base on the identification code. It's convenient for users to store their own user data without entering ID code and password on the mobile phone. The user data is stored corresponding to the identification code in the server, when the user change a terminal, or the user data in the terminal is wiped, the user only need to connect the audio conversion device to the terminal to obtain the user data stored in the server corresponding to the identification code of the audio conversion device, implementing a fast restoration of the user data.

DETAILED DESCRIPTION OF THE EMBODIMENTS

Figure 1:
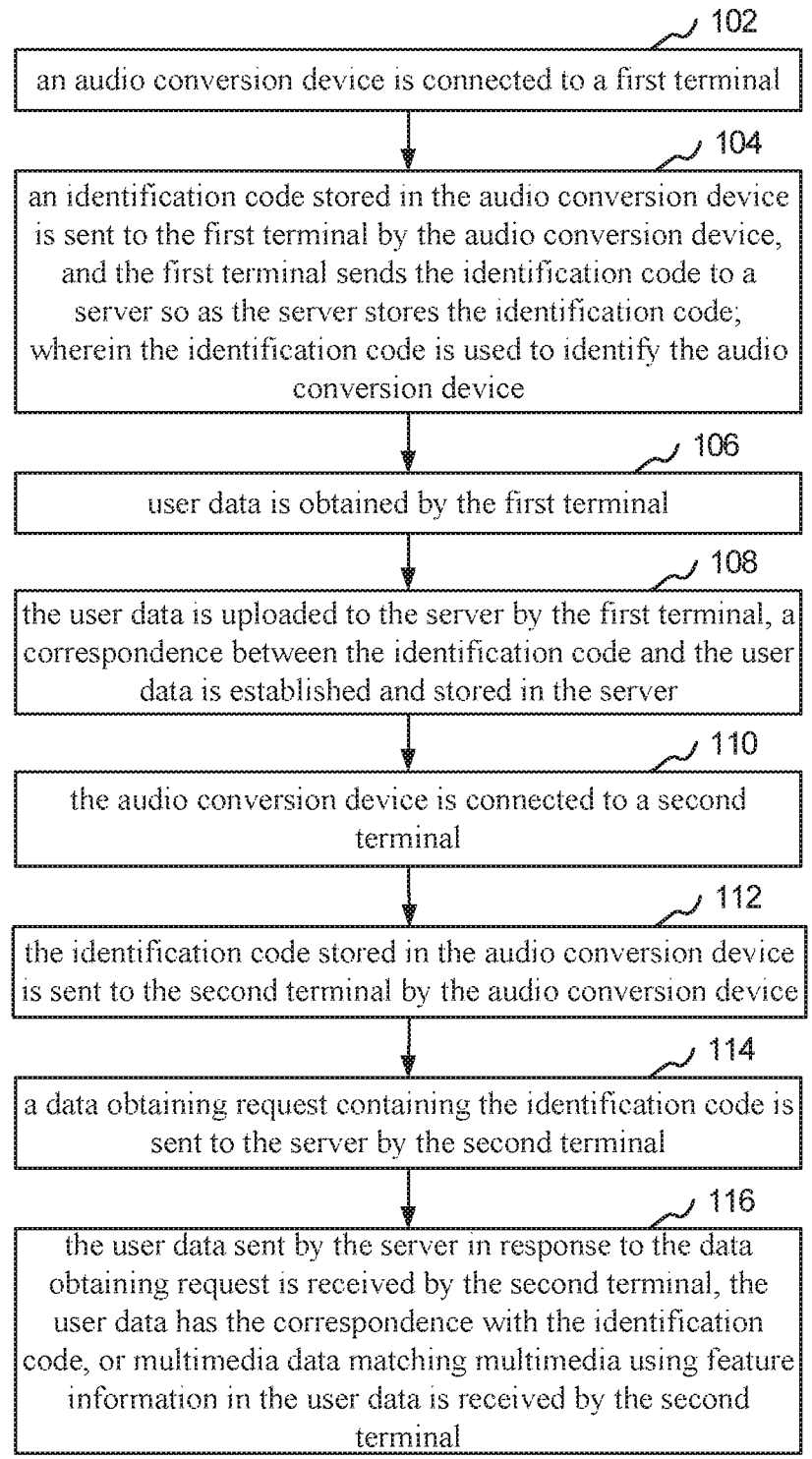
FIG. 1 is a flow chart of a processing method for identifying data by an audio conversion device in accordance with an embodiment.

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Elements that are identified using the same or similar reference characters refer to the same or similar elements.

Referring to FIG. 1, in an embodiment, a processing method for identifying data by an audio conversion device is provided, which specifically includes the following steps:

Step 102, the audio conversion device is connected to a first terminal.

The audio conversion device is a device that can convert audio data and be connected to a terminal. In an embodiment, the audio conversion device can be one of an earphone, a loudspeaker and a music player, etc. The earphone can be one of an ear bud, an in-ear headphone, a heads-free earphone and an ear-hook headphone, etc. The first terminal can be one of a mobile phone, a tablet computer, a smart controller, a personal computer and a laptop, etc.

In an embodiment, the earphone includes an earphone body and an earphone wire which is connected to the earphone body. The earphone body includes an audible unit. One end of the earphone wire is connected to an earphone body, and the other end of the earphone wire is an earphone plug. The earphone is electrically connected to the first terminal while the earphone plug is inserted into an earphone jack of the first terminal. The earphone wire can include a wire control device, which can be positioned on anyplace of the earphone wire. The wire control device is configured to send playing control instructions to the first terminal, such as a pause/play instruction, a fast forward instruction, a backward instruction or a multi-media switch instruction, etc, so as to control the first terminal to perform corresponding operation according to the playing control instructions.

In an embodiment, the earphone includes an earphone body. The earphone body includes an audible unit, a wireless signal transceiver and a power unit. The power unit is configured to supply power for the audible unit and the wireless signal transceiver. The wireless signal transceiver is configured to establish a wireless connection with the first terminal by matching with a wireless signal transceiver of the first terminal, such that the earphone is wireless connected to the first terminal. The wireless signal transceiver can be a Bluetooth transceiver or a 2.4G wireless signal transceiver.

Step 104, an identification code stored in the audio conversion device is sent to the first terminal by the audio conversion device, and the first terminal sends the identification code to a server so as the server stores the identification code; wherein the identification code is used to identify the audio conversion device.

Specifically, the audio conversion device further includes a memory and a control unit. When the audio conversion device is an earphone, the memory and the control unit can be assembled on the earphone body or the wire control device of the earphone, and the memory and the control unit can be packaged in a chip. The memory is configured to store the identification code, and the identification code, which may be a character string, is used to identify different audio conversion devices. The control unit is configured to read the identification code stored in the memory and send the identification code to the first terminal when the audio conversion device is connected to the first terminal. The control unit can be a digital chip. In an embodiment, the identification code is stored in a memory card inserted into the audio conversion device. The memory card is a non-volatile memory medium. The non-volatile memory medium refers to a memory medium that prevents data stored therein from disappearing when electric current is switched off, including a magnetic memory medium, a semiconductor memory medium or an optical memory medium.

Furthermore, the audio conversion device can modulate the identification code into a radio wave via the wireless signal transceiver in the audio conversion device and broadcast the radio wave, and then the first terminal receives and demodulates the radio wave to obtain the identification code via a wireless signal transceiver in the first terminal. Alternatively, when the audio conversion device is an earphone, the earphone can convert the identification code into an audio signal and send the audio signal to the first terminal, such that the first terminal receives the audio signal and de-emphasizes the audio signal into the identification code. Specifically, the earphone wire includes a left channel audio circuit, a right channel audio circuit and a microphone circuit, and the earphone can send an audio signal converted from an identification code of the earphone to the first terminal via the microphone circuit.

An audio conversion device control application matching the audio conversion device and/or a preset third-party application may be run on the first terminal. The first terminal can send the identification code to the server via the control application or the preset third-party application. The first terminal sends the identification code to the server via a network. The network may be a wifi, a 2G (The second generation of mobile communication technology), a 3G (The third generation of mobile communication technology) or a 4G(The fourth generation of mobile communication technology), etc. The preset third-party application may be an instant messaging applications, such as WeChat, QQ, MSN(Microsoft Service Network), or a multimedia playback application, etc.

The server receives and stores the identification code sent by the first terminal, so that in subsequent use of the audio conversion device, the server or the first terminal can identify the audio conversion device according to the identification code. Specifically, when the audio conversion device is connected to the first terminal again, the audio conversion device sends the identification code to the first terminal, and the first terminal uploads the identification code to the server. The server searches at local and determines whether the identification code has been stored in the memory of the server or not, if the identification code has been stored in the memory of the server, the server can identify the audio conversion device according to the identification code.

In an embodiment, the step of sending the identification code to the server via the first terminal, and the server storing the identification code includes: the first terminal's identity and the identification code of the audio conversion device are uploaded correspondingly to the server by the first terminal, and a correspondence between the identification code of the audio conversion device and the identity of the first terminal is stored in the server. By this way, a correlation between the audio conversion device and the first terminal is established in the server, and whether the audio conversion device is used by the first terminal can be determined according to the correlation in the subsequent use.

Step 106, user data is obtained by the first terminal.

The first terminal can obtain user data stored in the local directly, and user data downloaded to the local via a network, or user data sent from other devices. The user data mentioned here refers to user data stored in the local permanently, or cached in the local.

The user data refers to the user data produced in the usage of terminal. The user data includes but not limited to multimedia data, multimedia using feature information, terminal setting information, contact information and communication record, etc. Specifically, the first terminal can obtain the user data stored corresponding to the preset third-party application, such as multimedia data and multimedia using feature information corresponding to the multimedia playback application, terminal setting information corresponding to system setting application, contact information and communication records corresponding to telephone application.

The multimedia data may be audio files, photos or video files, etc. The multimedia using feature information refers to feature information of the multimedia used by users, such as multimedia file name, volume and multimedia type, etc. File name words, volume or multimedia types that occur more than a preset times can be used as the multimedia feature information. The terminal setting information refers to operation of desired parameters for running of terminal, such as screen brightness, volume, interface skin and icon arrangement, etc. The communication records refer to records generated in the communication with contacts.

Step 108, the user data is uploaded to the server by the first terminal, a correspondence between the identification code and the user data is established and stored in the server.

The user data can be uploaded together with the identification code to the server by the first terminal, or the identification code is uploaded to the server first and then the user data is uploaded to the server later. The server receives the identification code and the user data, and stores them correspondingly.

Step 110, the audio conversion device is connected to a second terminal.

The second terminal can be a terminal different from the first terminal, or the first terminal itself. Specifically, if the second terminal is the first terminal itself, the step 110 means that the audio conversion device is connected to the first terminal again.

Furthermore, if the second terminal is a terminal different from the first terminal, an earphone plug of the audio conversion device can be pulled out from an earphone jack of the first terminal and be inserted into an earphone jack of the second terminal, so that the audio conversion device is electrically connected to the second terminal. Alternatively, the audio conversion device is provided with multiple earphone plugs, such that the audio conversion device can be electrically connected to the first terminal via an earphone plug and be electrically connected to the second terminal via another earphone plug at the same time. The audio conversion device may also be wirelessly connected to the second terminal by connecting a wireless signal transceiver of the audio conversion device to a wirelessly signal transceiver of the second terminal.

Step 112, the identification code stored in the audio conversion device is sent to the second terminal by the audio conversion device.

The control unit of the audio conversion device is configured to read identification code from a memory and send the identification code to the second terminal when the audio conversion device is connected to the second terminal. Specifically, the audio conversion device can modulate the identification code to radio wave for broadcasting via the wireless signal transceiver, and the second terminal receives the radio wave sent from the audio conversion device and demodulates the radio wave to obtain the identification code via its wireless signal transceiver. Alternatively, if the audio conversion device is an earphone, the earphone converts the identification code into audio signal and sends the audio signal to the second terminal via an earphone wire, and the second terminal receives the audio signal and restoring the audio signal into the identification code. Specifically, the earphone wire includes left channel circuit and microphone circuit. The earphone can send the audio signal converted from identification code of the earphone to the second terminal via microphone circuit.

Step 114, a data obtaining request containing the identification code is sent to the server by the second terminal.

A control application matching the audio conversion device and/or a preset third-party application may be run on the second terminal. The second terminal is triggered by the control application or the preset third-party application to send the data obtaining request containing the identification code to the server.

Step 116, the user data sent by the server in response to the data obtaining request is received by the second terminal, the user data has the correspondence with the identification code, or multimedia data matching multimedia using feature information in the user data is received by the second terminal.

The server responds to the data obtaining request sent by the second terminal, and searches the user data corresponding to the identification code contained in the data obtaining request according to the correspondence between the identification code stored at local and the user data. When the user data is found, the server will return the user data to the second terminal, and the second terminal receives the user data and stores it corresponding to the identification code. If the user data has not been found, the server will return a feedback information representing a failed request to the second terminal. Specifically, the user data corresponding to the identification code can be stored corresponding to application identifier of the preset third-party application, and the user data acquired by the second terminal is stored in the second terminal under the specified path of the preset third-party application.

The user data includes multimedia using feature information. The second terminal receives the multimedia data sent by the server in response to the data obtaining request, and the multimedia data matches multimedia using feature information corresponding to the identification code.

Specifically, the server can not only return the user data to the second terminal, but also return the multimedia data relevant to the user data to the second terminal. Specifically, a multimedia database is built in the server, and multimedia using feature information can be extracted from the multimedia data in the multimedia database. Therefore, when the data obtaining request is received, the server returns the multimedia data corresponding to the identification code containing multimedia feature information matched with the multimedia using feature information.

According to the above processing method and system for identifying data by an audio conversion device, when the audio conversion device is connected to the first terminal, the identification code stored in the audio conversion device can be sent to the first terminal. The first terminal then sends the identification code to the server, and the server stores the identification code. User data is stored in the server corresponding to the identification code, by this way the identification codes can be used as identifications for distinguishing users and the user data belong to a user can be stored in the server corresponding to the identification code, and a different data service can be provided base on the identification code. It's convenient for users to store their own user data without entering ID code and password on the mobile phone. The user data is stored corresponding to the identification code in the server, when the user change a terminal, or the user data in the terminal is wiped, the user only need to connect the audio conversion device to the terminal to obtain the user data stored in the server corresponding to the identification code of the audio conversion device, implementing a fast restoration of the user data.

In an embodiment, the method further includes: a data obtaining request containing the identification code is sent by the first terminal; the user data sent by the server in response to the data obtaining request is received by the first terminal, and the user data has correspondence with the identification code, or multimedia data matching multimedia using feature information in the user data is received by the second terminal.

In an embodiment, the audio conversion device can be an earphone, and the earphone includes an earphone body and an earphone wire connected to the earphone body. The earphone wire is provided with a wire control device configured to store the identification code of the earphone. The earphone wire is configured to be connected to the first terminal and/or the second terminal.

In an embodiment, the processing method for identifying data by an audio conversion device further includes step 11) to step 12):

Step 11), a login validate credential inputting request is received by the first terminal or the second terminal, and an inputted login validate credential according to the login validate credential inputting request is obtained.

When the audio conversion device is connected to the first terminal, the first terminal receives a login validate credential inputting request and obtains an inputted login validate credential according to the login validate credential inputting request. When the audio conversion device is connected to the second terminal, the second terminal receives the login validate credential inputting request and obtains the inputted login validate credential according to the login validate credential inputting request.

The login validate credential refers to data for validating a user login request by the server during a subsequent login operation. The login validate credential may be account number and/or a password, or a user biological feature, such as a fingerprint, an iris, a facial appearance or a palm print, etc.

In an embodiment, the step 11) includes: an inputting request of account number and/or password is received by the first terminal or the second terminal, an input field of account number and/or password is popped up according to the inputting request of account number and/or password on the first terminal or the second terminal, and the inputted account number and/or the inputted password are obtained in the input field of account number and/or password.

In an embodiment, the step 11) includes: an inputting request of biological feature is received by the first terminal or the second terminal, and the first terminal or the second terminal collects a user biological feature via biological feature collector according to the inputting request of biological feature. The user biological feature includes at least one of a fingerprint, an iris, a facial appearance and a palm print.

The step 12), a correspondence between the login validate credential and the identification code is stored in local by the first terminal or the second terminal, and/or, the login validate credential is uploaded to the server by the first terminal or the second terminal, so that the correspondence between the login validate credential and the identification code is stored in the server. The login validate credential is used for login and verification.

The first terminal or the second terminal can obtain the account number and/or password as login validate credential, or, collect a user biological feature as login validate credential, and uploads the login validate credential to the server. Correspondence between the login validates credential and the identification code is stored in the server, such that the correspondence can be used as credential for login and verification in subsequent usage.

Figure 2:
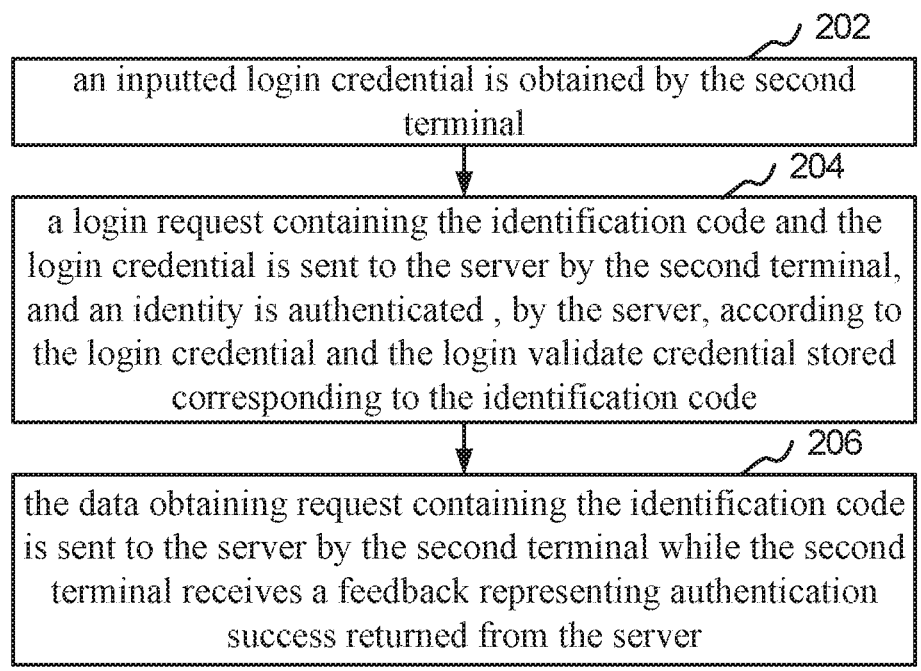
FIG. 2 is a flow chart of a second terminal sending a data obtaining request containing an identification code to a server in accordance with an embodiment.

Referring to FIG. 2, in an embodiment, the step 114 specifically comprises:

Step 202, an inputted login credential is obtained by the second terminal.

The second terminal can trigger a login request when the second terminal receives the identification code sent by the audio conversion device, and receive the login request via the control application of the audio conversion device or the preset third-party application. Alternatively, the second terminal can trigger a login request when a user is trying to access a controlling interface of the control application or the preset third-party application, and receive the login request via the control application of the audio conversion device or the preset third-party application.

The login validate credential is provided by a user to prove the user's identity. If the login validate credential is an account number and/or a password, the second terminal will pop up a login interface according to the login request and obtain an account number and/or a password inputted in the login interface by a user. If the login validate credential is a user biological feature, the second terminal will collect the user biological feature according to the login request, and the type of the user biological feature is consistent with the type of the user biological feature collected in inputting login validate credential.

Step 204, a login request containing the identification code and the login credential is sent to the server by the second terminal, and an identity is authenticated, by the server, according to the login credential and the login validate credential stored corresponding to the identification code.

The second terminal sends the login request to the server, and the login request contains the identification code and the login credential. The server compares the login credential and the login validate credential corresponding to the identification code according to the login request, and authenticates the user identity when the login credential is matched with the login validate credential corresponding to the identification code.

Step 206, the data obtaining request containing the identification code is sent to the server by the second terminal while the second terminal receives a feedback representing authentication success returned from the server.

The server returns a feedback representing authentication success to the second terminal when the server determines that the login credential matches the login validate credential stored corresponding to the identification code; on the contrary, the server returns a feedback representing authentication fail to the second terminal when the server determines that the login credential does not match the login validate credential stored corresponding to the identification code. The second terminal will gain access to send a data obtaining request containing the identification code to the server via the control application of the audio conversion device or the preset third-party application when the second terminal receives the feedback representing authentication success.

In the illustrated embodiment, when the audio conversion device is connected to the second terminal, the second terminal tries to obtain user data corresponding to the identification code from the server, and the authentication can ensure the safety of the user data.

In an embodiment, the step 114 further includes: an inputted login credential is obtained by the second terminal; an identity is authenticated by the second terminal according to the login credential and the login validate credential which is stored corresponding to the identification code, and a data obtaining request containing the identification code is sent to the server when the second terminal receives a feedback representing authentication success.

In an embodiment, the processing method further includes: an inputted login credential is obtained by the first terminal. A login request containing an identification code and a login credential is sent to the server by the first terminal, and the server authenticates an identity according to the login credential and the login validate credential stored corresponding to the identification code. The first terminal will send a data obtaining request containing the identification code to the server when the first terminal receives a feedback representing authentication success returned from the server. The first terminal receives the user data sent by the server in response to the data obtaining request, the user data has the correspondence with the identification code, and/or the second terminal receives multimedia data matching multimedia using feature information in the user data.

Figure 3:
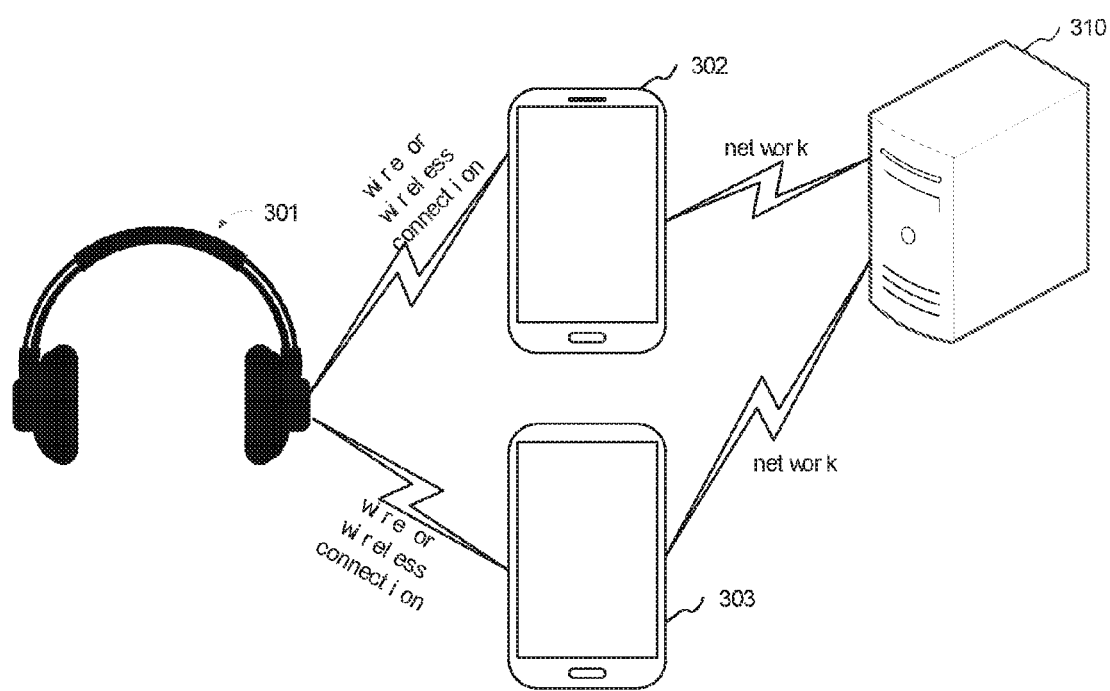
FIG. 3 is an application scene diagram of a processing system for identifying data by an audio conversion device in accordance with an embodiment.

Referring to FIG. 3, in an embodiment, a processing system for identifying data by an audio conversion device is provided, and the processing system is used to implement the processing method for identifying data by an audio conversion device in the above embodiments.

The audio conversion device 301 is configured to be connected to the first terminal 302.

In an embodiment, the audio conversion device 301 can be an earphone, a loudspeaker or a music player. In an embodiment, the earphone includes an earphone body and an earphone wire connected to the earphone body. The earphone body includes an audible unit configured to produce sound. An end of the earphone wire is connected to the earphone body, the other end of the earphone wire is an earphone plug, and the earphone plug is configured to insert into the earphone jack of the first terminal 302. The earphone wire provides a wire control device, and the wire control device can be configured in anywhere of the earphone wire. The wire control device is configured to send a playing control instruction such as a pause/play instruction, a fast forward instruction, a backward instruction or a multi-media switch instruction, etc, to the first terminal 302 connecting with the earphone via the earphone wire, so as to control the first terminal 302 to perform corresponding operation according to the playing control instruction.

In an embodiment, the earphone includes an earphone body, and the earphone body includes an audible unit, a wireless signal transceiver and a power unit. The power unit is configured to supply power for the audible unit and the wireless signal transceiver. The wireless signal transceiver in the earphone is configured to establish a wireless connection with the wireless signal transceiver of the first terminal 302, so that a wireless connection is established between the earphone and the first terminal 302. The wireless signal transceiver can be a bluetooth transceiver or a 2.4G wireless signal transceiver.

The audio conversion device 301 is further configured to send the identification code stored in the audio conversion device to the first terminal 302.

Specifically, the audio conversion device 301 further includes a memory and a control unit. While the audio conversion device is an earphone, the memory and the control unit can be assembled on the earphone body or wire control device of the earphone, and the memory and the control unit can be packaged in a chip. The memory is configured to store the identification code, and the identification code, which may be a character string, is used to identify different audio conversion devices 301. The control unit is configured to read the identification code stored in the memory and send the identification code to the first terminal 302 when the audio conversion device 301 is connected to the first terminal 302. The control unit can be a digital chip. In an embodiment, the identification code is stored in a memory card inserted into the audio conversion device 301. The memory card is a non-volatile memory medium. The non-volatile memory medium refers to a memory medium that prevents data stored therein from disappearing when electric current is switched off, including a magnetic memory medium, a semiconductor memory medium or an optical memory medium.

Furthermore, the audio conversion device can modulate the identification code into a radio wave via the wireless signal transceiver in the audio conversion device and broadcast the radio wave, and then the first terminal receives and demodulates the radio wave to obtain the identification code via a wireless signal transceiver in the first terminal. Alternatively, the audio conversion device is an earphone. The earphone can convert the identification code into an audio signal and send the audio signal to the first terminal, such that the first terminal receives the audio signal and de-emphasizes the audio signal into the identification code. Specifically, the earphone wire includes a left channel audio circuit and a microphone circuit, and the earphone can send an audio signal converted from an identification code of the earphone to the first terminal via the microphone circuit.

The first terminal 302 is configured to send the identification code to the server 310, and the identification code is stored in the server 310. The identification code is used to identify the audio conversion device 301.

The first terminal 302 is configured to send the identification code to the server 310 via the control application or the preset third-party application. The preset third-party application may be WeChat, QQ, MSN(Microsoft Service Network), etc, or a multimedia playback application, etc.

The server 310 is configured to store the identification code when the server 310 receives the identification code sent by the first terminal 302, so that in subsequent use of the audio conversion device, the server 310 or the first terminal 302 can identify the audio conversion device 301 according to the identification code. Specifically, when the audio conversion device 301 is connected to the first terminal 302 again, the audio conversion device 301 will send the identification code to the first terminal 302, and then the first terminal 302 will upload the identification code to the server 310. The server 310 searches whether the identification code has been stored in the memory of the server 310 and the server 310 is able to identify the audio conversion device 301 according to the identification code.

In an embodiment, the first terminal 302 is configured to send a first terminal identification and the corresponding identification code to the server 310, and a correspondence between the identification code and the first terminal identification is stored in the server 310. By this way, a correlation between the audio conversion device 301 and the first terminal 302 is established in the server 310, and whether the audio conversion device is used by the first terminal can be determined according to the correlation in subsequent applications.

The first terminal 302 is further configured to obtain user data.

The first terminal 302 is also configured to obtain the user data stored in the local directly, or obtain the user data downloaded to the local via network, or obtain the user data from other devices. The user data can be stored in the local permanently, or only be cached at local.

The user data refers to the user data produced in the usage of the first terminal 302. The user data includes but not limited to multimedia data, multimedia using feature information, terminal setting information, contact information and communication records, etc. Specifically, the first terminal 302 is configured to obtain the user data stored corresponding to the preset third-party application, such as multimedia data and multimedia using feature information corresponding to the multimedia playback application, terminal setting information corresponding to system setting application, contact information and communication records corresponding to telephone application.

The multimedia data may be audio files, photos or video files, etc. The multimedia using feature information refers to feature information of the multimedia used by users, such as multimedia file name, volume and multimedia type, etc. File name words, volume or multimedia types that occur more than a preset times can be used as the multimedia feature information. The terminal setting information refers to operation of desired parameters for running of terminal, such as screen brightness, volume, interface skin and icon arrangement, etc. The communication records refers to records generated in the communication with contacts.

The first terminal 302 is further configured to send the user data to the server 310, such that the server 310 stores the correspondence between the identification code and the user data.

The first terminal 302 is configured to upload the identification code together with the user data to the server 310, or upload the identification code to the server 310 first and upload the user data to the server 310 later. The server 310 receives the identification code and the user data, and stores them correspondingly.

The audio conversion device 301 is further configured to be connected to the second terminal 303.

The second terminal 303 can be a terminal different from the first terminal 302, or the second terminal 303 can be the first terminal 302 itself. Specifically, if the second terminal 303 is the first terminal 302 itself, the step 110 means that the audio conversion device 301 is connected to the first terminal 302 again.

Furthermore, if the second terminal 303 is a terminal different from the first terminal 302, an earphone plug of the audio conversion device 301 can be pulled out from an earphone jack of the first terminal 302 and be inserted into an earphone jack of the second terminal 303, so that the audio conversion device 301 is electrically connected to the second terminal 303. Alternatively, the audio conversion device 301 is provided with multiple earphone plugs, the audio conversion device 301 can be electrically connected to the first terminal 302 via an earphone plug and be electrically connected to the second terminal 303 via another earphone plug at the same time. The audio conversion device 301 may also be wirelessly connected to the second terminal by connecting a wireless signal transceiver of the audio conversion device 301 to a wirelessly signal transceiver of the second terminal 303.

The audio conversion device 301 is further configured to send the identification code stored in the audio conversion device 301 to the second terminal 303.

The control unit of the audio conversion device 301 is configured to read an identification code from a memory and send the identification code to the second terminal 303 when the audio conversion device 301 is connected to the second terminal 303. Specifically, the audio conversion device 301 can modulate the identification code into a radio wave for broadcasting via the wireless signal transceiver. The second terminal 303 receives the radio wave sent from the audio conversion device 301 and demodulates the radio wave to obtain the identification code via its wireless signal transceiver. Alternatively, the audio conversion device 301 is an earphone. The earphone converts the identification code into audio signal and sends the audio signal to the second terminal 303 via an earphone wire, and the second terminal 303 receives the audio signal and de-emphases the audio signal to the identification code. Specifically, the earphone wire includes left channel circuit and microphone circuit. The earphone can send the audio signal converted from identification code of the earphone to the second terminal 303 via microphone circuit.

The second terminal 303 is configured to send a data obtaining request containing the identification code to the server 310.

The second terminal 303 is configured to be triggered by the control application or the preset third-party application and send the data obtaining request containing the identification code to the server.

The second terminal 303 is further configured to receive the user data sent by the server 310 in response to the data obtaining request, and the user data corresponding to the identification code, or receive multimedia data matching multimedia using feature information in the user data.

The server 310 is configured to respond to the data obtaining request sent by the second terminal 303, and searches the user data corresponding to the identification code contained in the data obtaining request according to the correspondence between the identification code stored at local and the user data. If the user data is found, the server 310 will return the user data to the second terminal 303, and the second terminal 303 receives the user data and stores it corresponding to the identification code. If the user data has not been found, the server 310 will return feedback information representing a failed request to the second terminal 303. Specifically, the user data corresponding to the identification code can be stored corresponding to application identifier of the preset third-party application, and the second terminal 303 stores acquired user data under the specified path of the preset third-party application.

The user data may includes multimedia using feature information. The second terminal 303 receives the multimedia data sent by the server 310 in response to the data obtaining request, and the multimedia data matches multimedia using feature information corresponding to the identification code.

Specifically, the server 310 can not only return the user data to the second terminal 303, but also return the multimedia data relevant to the user data to the second terminal 303. Specifically, a multimedia database is built in the server 310, and multimedia using feature information can be extracted from the multimedia data in the multimedia database. Therefore, when the data obtaining request is received, the server 310 returns the multimedia data corresponding to the identification code, and the multimedia data containing multimedia feature information matched with the multimedia using feature information.

According to the above processing method and system for identifying data by an audio conversion device, when the audio conversion device 301 is connected to the first terminal 302, the identification code stored in the audio conversion device 301 can be sent to the first terminal 302. The first terminal 302 then sends the identification code to the server 310, and the server 310 stores the identification code. User data is stored in the server corresponding to the identification code, by this way the identification codes can be used as identifications for distinguishing users and the user data belong to a user can be stored in the server 310 corresponding to the identification code, and a different data service can be provided base on the identification code. It's convenient for users to store their own user data without entering ID code and password on the mobile phone. The user data is stored corresponding to the identification code in the server 310, when the user change a terminal, or the user data in the terminal is wiped, the user only need to connect the audio conversion device 301 to the terminal to obtain the user data stored in the server 310 corresponding to the identification code of the audio conversion device, implementing a fast restoration of the user data.

In an embodiment, the first terminal 302 is further configured to send the data obtaining request containing the identification code to the server 310; the first terminal 302 is further configured to receive user data sent by the server 310 in response to the data obtaining request, and the user data has correspondence with the identification code, or, the second terminal 303 is further configured to receive multimedia data matching multimedia using feature information in the user data.

In an embodiment, the audio conversion device 301 can be an earphone, and the earphone includes an earphone body and an earphone wire connected to the earphone body. The earphone wire is provided with a wire control device, and the wire control device is configured to store the identification code. The earphone wire is configured to be connected to the first terminal 302 and/or the second terminal 303.

In an embodiment, the first terminal 302 or the second terminal 303 is further configured to receive a login validate credential inputting request, and obtain an inputted login validate credential according to the login validate credential inputting request.

When the audio conversion device 301 is connected to the first terminal 302, the first terminal 302 is configured to receive a login validate credential inputting request, and obtain an inputted login validate credential according to the login validate credential inputting request; when the audio conversion device 301 is connected to the second terminal 303, the second terminal 303 is configured to receive the login validate credential inputting request and obtain the inputted login validate credential according to the login validate credential inputting request.

In an embodiment, the first terminal 302 or the second terminal 303 is configured to receive an inputting request of account number and/or password, pop up an input field of account number and/or password according to the inputting request of account number and/or password, and obtain an inputted account number and/or a password in the input field of account number and/or password.

In an embodiment, the first terminal 302 or the second terminal 303 is configured to receive an inputting request of biological feature and collect a user biological feature via a biological feature collector according to the inputting request of biological feature. The user biological feature includes at least one of fingerprint, iris, facial appearance and palm print.

The first terminal 302 or the second terminal 303 is further configured to upload the login validate credential to the server 310, and the server 310 stores a correspondence between the login validate credential and the identification code. The login validate credential is configured for login and verification.

The first terminal 302 or the second terminal 303 obtains an account number and/or a password as a login validate credential, or, collects a user biological feature as a login validate credential, and uploads the login validate credential to the server 310. The server 310 stores the correspondence between the login validate credential and the identification code, and the correspondence can be used as a credential for login and verification in subsequent usage.

In an embodiment, the second terminal 303 is further configured to obtain an inputted login credential.

The second terminal 303 is configured to trigger a login request and receive the login request via the control application of the audio conversion device 301 or the preset third-party application when the second terminal 303 receives the identification code sent by the audio conversion device 301. Alternatively, the second terminal 303 is configured to trigger a login request and receive the login request via the control application of the audio conversion device 301 or the preset third-party application when a user is trying to access a controlling interface of the control application or the preset third-party application.

The login validate credential is provided by a user to prove the user's identity. If the login validate credential is an account number and/or a password, the second terminal 303 will display a login interface according to the login request and obtain an account number and/or a password inputted in the login interface by a user. If the login validate credential is a user biological feature, the second terminal 303 will collect the user biological feature according to the login request, and the type of the user biological feature is consistent with the type of the user biological feature collected in inputting login validate credential.

The second terminal 303 is further configured to send a login request containing the identification code and the login credential to the server 301, and the server 310 authenticates an identity according to the login credential and the login validate credential stored corresponding to the identification code.

The second terminal 303 is further configured to send the login request to the server, and the login request contains the identification code and the login credential. The server 310 is configured to authenticate according to login request via comparison between the login credential and the login validate credential corresponding to the identification code.

The second terminal 303 is further configured to send the data obtaining request containing the identification code to the server while the second terminal receives a feedback representing authentication success returned from the server.

The server 310 is configured to return a feedback representing authentication success to the second terminal 303 if the server 310 determines that the login credential is matched with the login validate credential stored corresponding to the identification code; on the contrary, the server 310 is configured to return a feedback representing authentication fail to the second terminal if the server 310 determines that the login credential is not matched with the login validate credential stored corresponding to the identification code. The second terminal 303 will gain access to send a data obtaining request containing the identification code to the server 310 via the control application of the audio conversion device 301 or the preset third-party application when the second terminal 303 receives the feedback representing authentication success.

In the illustrated embodiment, when the audio conversion device is connected to the second terminal 303 and the second terminal 303 tries to obtain user data corresponding to the identification code from the server 310, the safety of the user data is ensured via authentication.

In an embodiment, the second terminal 303 is further configured to obtain an inputted login credential; the second terminal 303 is further configured to authenticate an identity according to the login credential and the login validate credential which is stored corresponding to the identification code, and send a data obtaining request containing the identification code to the server 310 when the second terminal 303 receives a feedback representing authentication success.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A processing method for identifying data by an audio conversion device, comprising:
   connecting the audio conversion device to a first terminal;
   sending, by the audio conversion device, an identification code stored in the audio conversion device to the first terminal, and sending the identification code to a server via the first terminal; wherein the identification code is stored in the server and used to identify the audio conversion device;
   obtaining, by the first terminal, user data;
   uploading, by the first terminal, the user data to the server, wherein the user data is used to establish a correspondence between the identification code and the user data in the server;
   connecting the audio conversion device to a second terminal;
   sending, by the audio conversion device, the identification code stored in the audio conversion device to the second terminal;
   sending, by the second terminal, a data obtaining request containing the identification code to the server; and
   receiving, by the second terminal, the user data sent by the server in response to the data obtaining request, the user data has the correspondence with the identification code, or receiving, by the second terminal, multimedia data obtained and sent by the server in accordance with the identification code in response to the data obtaining request, wherein the multimedia data is matched with multimedia using feature information of the user data, the multimedia using feature information corresponds to the identification code.

2. The method according to claim 1, wherein the audio conversion device comprises one of an earphone, a loudspeaker, and a music player.

3. The method according to claim 1, wherein the identification code is stored in a memory card inserted in the audio conversion device.

4. The method according to claim 1, wherein the audio conversion device is an earphone, the sending the identification code stored in the audio conversion device to the first terminal by the audio conversion device comprises:
   converting, by the earphone, the identification code into an audio signal and sending the audio signal to the first terminal via an earphone wire, receiving, by the first terminal, the audio signal and restoring the audio signal to the identification code.

5. The method according to claim 1, further comprising:
   receiving, by the first terminal, a login validate credential inputting request, and obtaining an inputted login validate credential according to the login validate credential inputting request;
   uploading, by the first terminal, the login validate credential to the server, wherein the server stores a correspondence between the login validate credential and the identification code.

6. The method according to claim 5, further comprising:
   obtaining, by the first terminal, an inputted login credential;
   sending, by the first terminal, a login request containing the identification code and the login credential to the server, and authenticating an identity, by the server, according to the login credential and the login validate credential stored corresponding to the identification code;
   sending, by the first terminal, the data obtaining request containing the identification code to the server when the first terminal receives a feedback representing authentication success returned from the server; and
   receiving, by the first terminal, the user data corresponding to the identification code sent by the server in response to the data obtaining request, or multimedia data matching multimedia using feature information in the user data.

7. The method according to claim 1, wherein the audio conversion device is an earphone, the earphone comprises an earphone body and an earphone wire with a wire control device, the earphone wire is connected to the earphone body, the wire control device is configured to store the identification code; the earphone wire is configured to connect the first terminal or the second terminal.

8. A processing system for identifying data by an audio conversion device, comprising: an audio conversion device, a first terminal, and a second terminal; wherein the audio conversion device is configured to be connected to the first terminal;

the audio conversion device is further configured to send an identification code stored in the audio conversion device to the first terminal, wherein the identification code is used to identify the audio conversion device;

the first terminal is configured to send the identification code to a server, and the server stores the identification code;

the first terminal is further configured to obtain user data;

the first terminal is further configured to upload the user data to the server, and the server stores a correspondence between the identification code and the user data;

the audio conversion device is further configured to be connected to the second terminal;

the audio conversion device is further configured to send the identification code stored in the audio conversion device to the second terminal;

the second terminal is configured to send a data obtaining request containing the identification code to the server; and the second terminal is further configured to receive the user data sent by the server in response to the data obtaining request, the user data has the correspondence with the identification code, or the second terminal is further configured to receive multimedia data of the user data having the correspondence with the identification code sent in response to the data obtaining request by the server, wherein the multimedia data is matched with multimedia using feature information.

9. The system according to claim 8, wherein the audio conversion device comprises one of an earphone, a loudspeaker, and a music player.

10. The system according to claim 8, wherein the identification code is stored in a memory card inserted in the audio conversion device.

11. The system according to claim 8, wherein the audio conversion device is an earphone, the earphone is configured to convert the identification code into an audio signal and send the audio signal to the first terminal via an earphone wire, the first terminal is further configured to receive the audio signal and restore the audio signal to the identification code.

12. The system according to claim 8, wherein the first terminal is further configured to receive a login validate credential inputting request, and obtain an inputted login validate credential according to the login validate credential inputting request; the first terminal is further configured to upload the login validate credential to the server, and the server stores a correspondence between the login validate credential and the identification code.

13. The system according to claim 12, wherein the first terminal is further configured to obtain an inputted login credential; send a login request containing the identification code and the login credential to the server, and the server authenticates an identity according to the login credential and the login validate credential stored corresponding to the identification code; send the data obtaining request containing the identification code to the server when the first terminal receives a feedback representing authentication success returned from the server; and receive the user data sent by the server in response to the data obtaining request, the user data has the correspondence with the identification code, or receive multimedia data of the user data having the correspondence with the identification code sent in response to the data obtaining request by the server, wherein the multimedia data is matched with multimedia using feature information.

14. The system according to claim 8, wherein the audio conversion device is an earphone, the earphone comprises an earphone body and an earphone wire with a wire control device, the earphone wire is connected to the earphone body, the wire control device is configured to store the identification code; the earphone wire is configured to connect the first terminal or the second terminal.

\* \* \* \* \*